(No Model.) 4 Sheets—Sheet 2.

C. TRIER.
CIRCULAR SAWING MACHINE.

No. 322,658. Patented July 21, 1885.

Witnesses:
Chas. E. Gaylord.
Mason Bross.

Inventor:
Conrad Trier,
By Dyrenforth & Dyrenforth
Att'ys (No Model.) 4 Sheets—Sheet 3.
C. TRIER.
CIRCULAR SAWING MACHINE.
No. 322,658. Patented July 21, 1885.
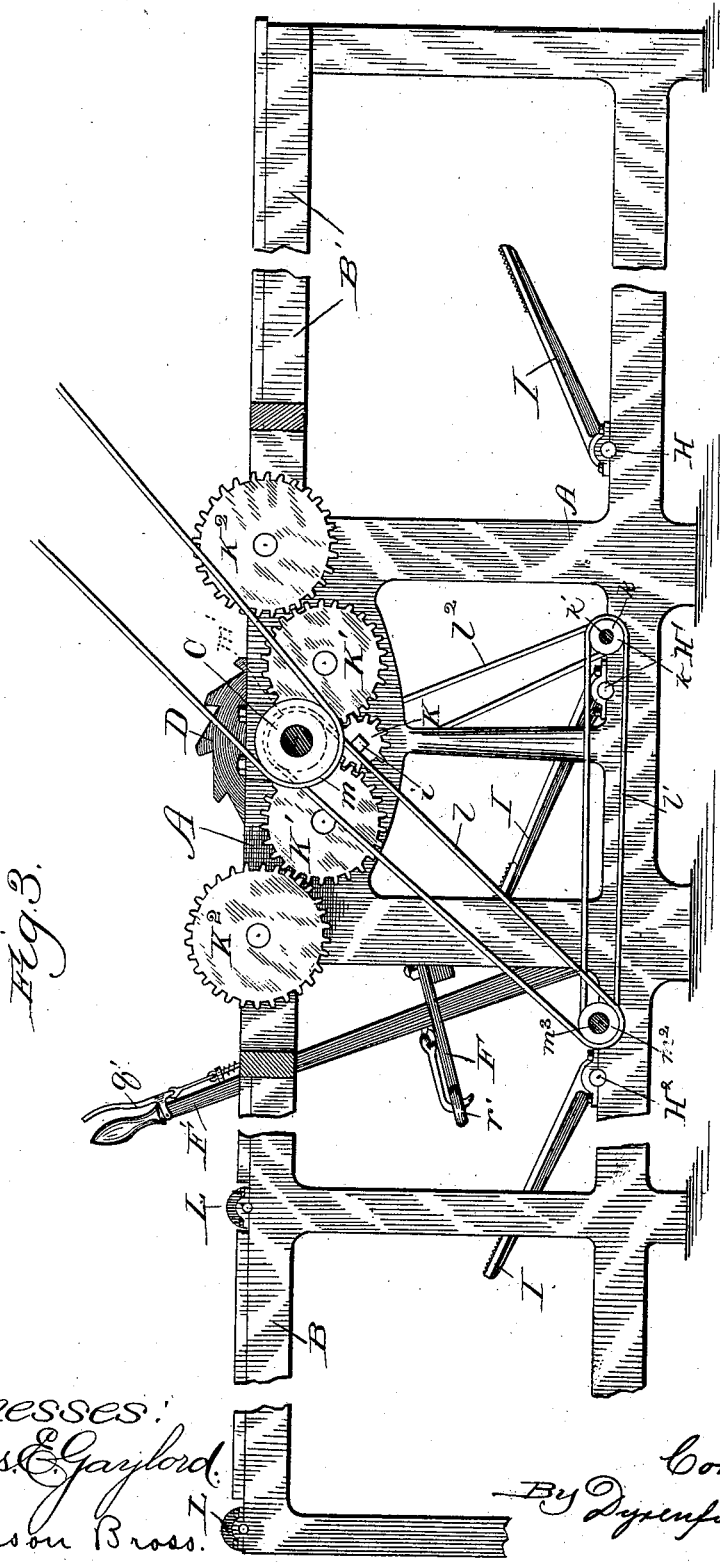
Witnesses:
Chas. E. Gaylord.
Mason Bross.
Inventor:
Conrad Trier,
By Dyrenforth & Dyrenforth,
Att'ys

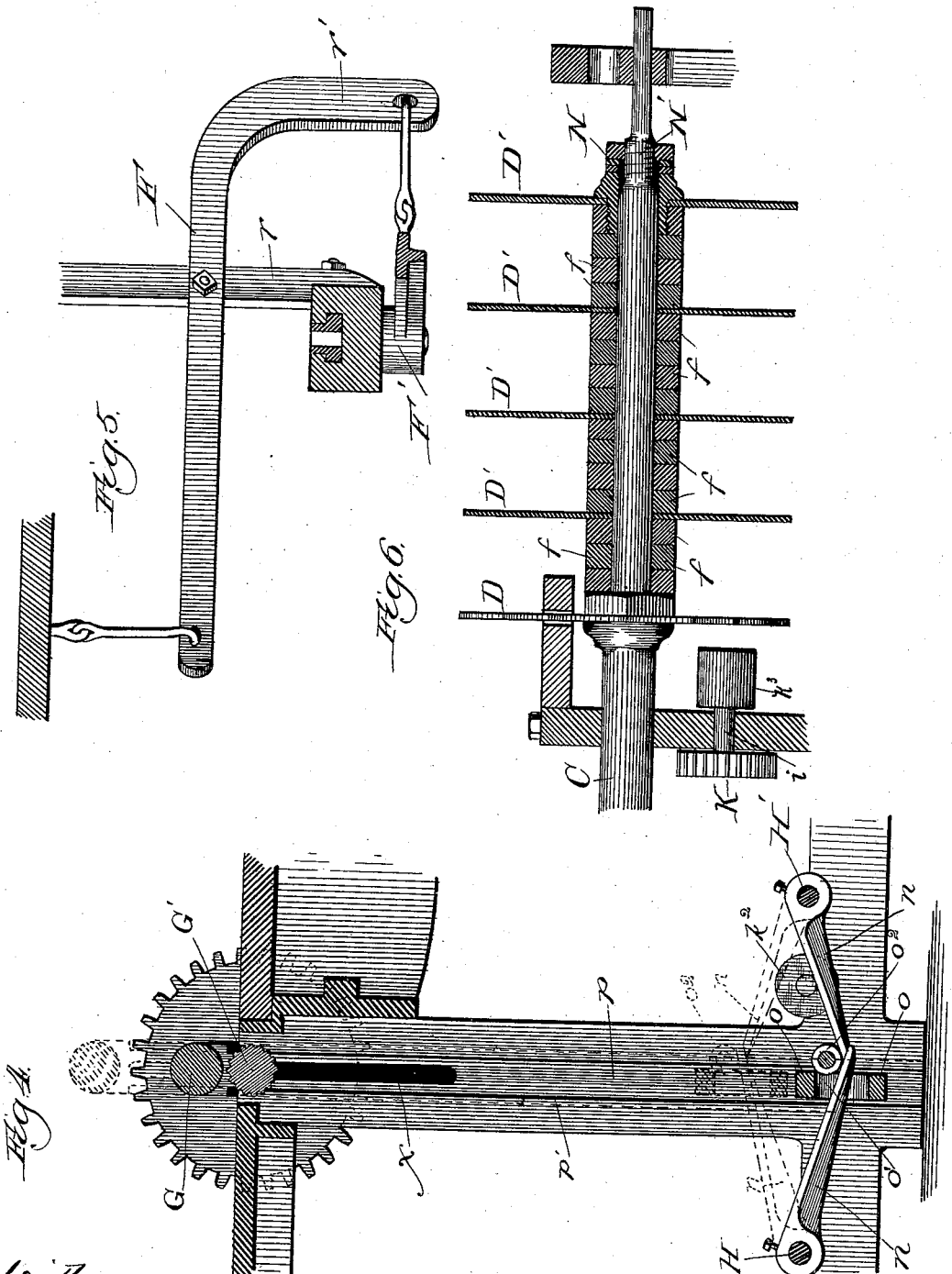

UNITED STATES PATENT OFFICE.

CONRAD TRIER, OF CHICAGO, ILLINOIS.

CIRCULAR SAWING MACHINE.

SPECIFICATION forming part of Letters Patent No. 322,658, dated July 21, 1885.

Application filed May 5, 1885. (No model.)

*To all whom it may concern:*

Be it known that I, CONRAD TRIER, a subject of the Emperor of Germany, residing at Chicago, in the county of Cook and State of Illinois, have invented certain new and useful Improvements in Sawing-Machines; and I hereby declare the following to be a full, clear, and exact description of the same.

My invention relates to the class of sawing-machines in which the object to be sawed is fed between rollers against rapidly-rotating circular saws; and it relates particularly to adjusting means for readily setting the saws with relation to each other to permit varying widths to be cut from objects.

It is my purpose to provide a device which shall have one stationary rotating circular saw, and to which another circular saw may be instantaneously adjusted to cut any desired width from the object to be sawed, and to which any desired number of circular saws may be adjusted to cut several lengths of the same of varying widths from the object to be sawed; and it is further my purpose to provide simple means to permit guiding of the object to be sawed against the sawing mechanism without necessitating the devotion of close attention to the work by the operator, and also to permit ready raising of the upper guide-rolls without subjecting the operator to inconvenience or interfering with the continued progress of the machine.

To these ends my invention consists in providing the rotary shaft to which the power is transmitted with a stationary circular saw and with a movable circular saw adjustable by particular mechanism; and my invention further consists in the foot-lever mechanism for controlling the feeding mechanism; and it also consists in means for guiding to the saws the object to be sawed.

My invention still further consists in certain details of construction and combinations of parts, all as hereinafter more particularly set forth.

Figure 1:
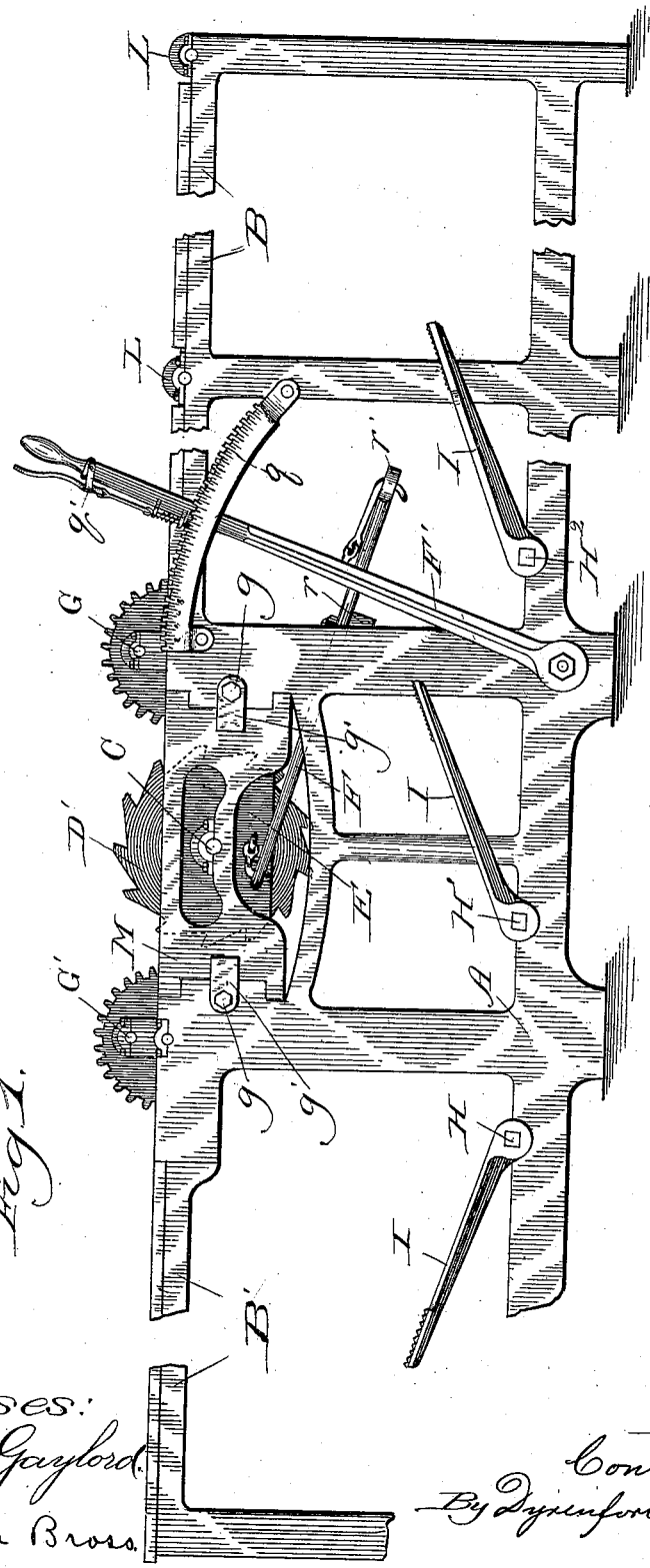
Figure 2:
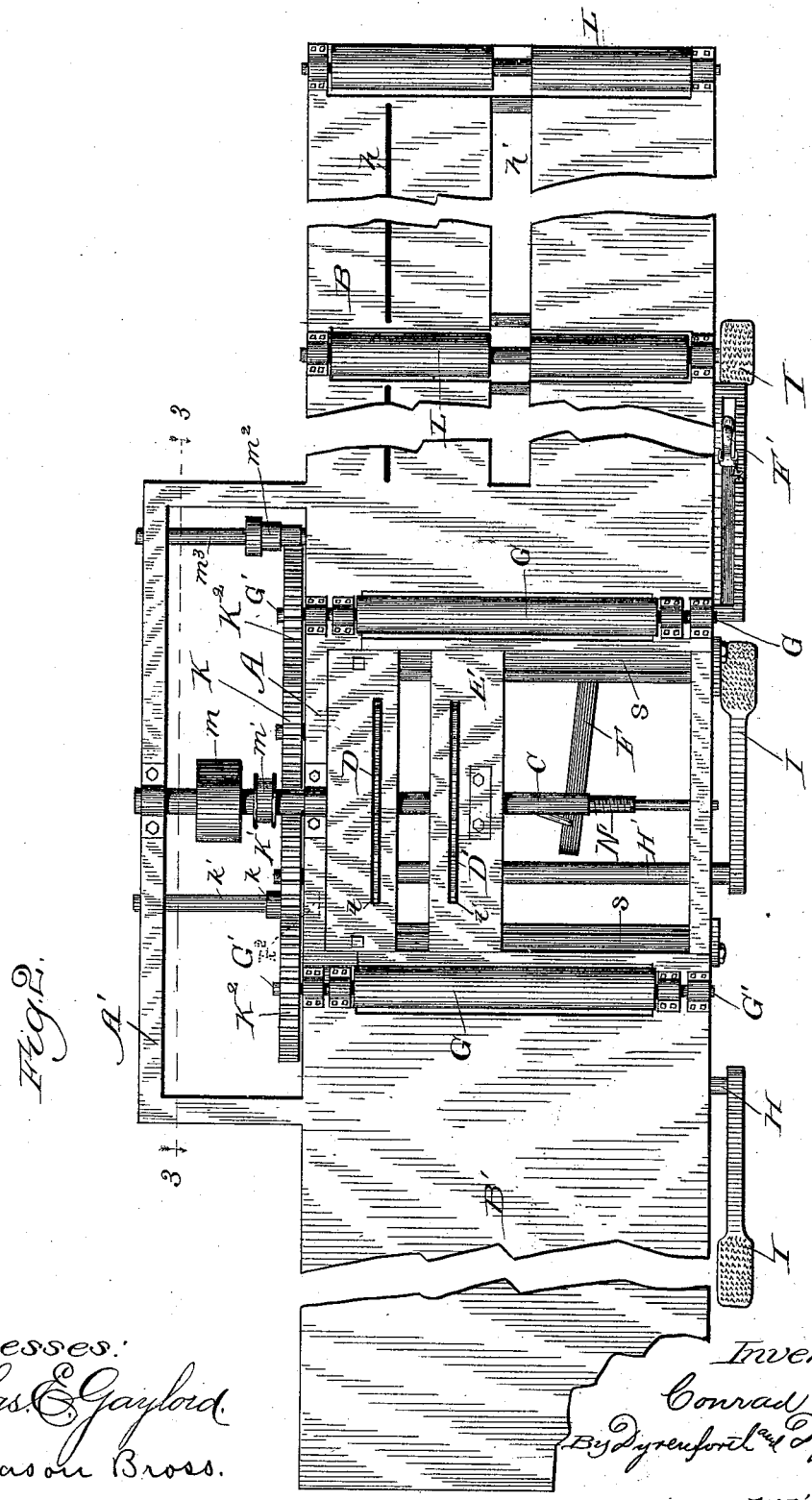

Referring to the drawings, Figure 1 is a view in elevation representing one side of the device, having a portion broken away toward each end; Fig. 2, a plan view of the machine; Fig. 3, a view in elevation taken on the line 3 3 of Fig. 2, representing the side of the device opposite to that shown in Fig. 1; Fig. 4, a detail view showing the mechanism for raising the rear upper feed-roller; Fig. 5, a detail view of the lever mechanism for moving the adjustable saw upon the shaft, and Fig. 6 a sectional plan view representing the adjustment of more than one saw upon the shaft.

A is the frame of the machine which supports the operating mechanisms.

B is an extension to afford a table for supporting the boards as they are fed to the saws, and B' is a similar table behind the saws.

C is a rotary shaft extending transversely across the frame A, and supported toward its extremities in bearings provided in the frame. One side of the frame A is provided, as shown in Fig. 2, with additional frame-work, A', in which a journal-bearing for one extreme end of the shaft C is afforded, thereby to support, with the adjacent side of the frame A, the shaft with sufficient stability to permit the bearing on the opposite side of the frame, which is removable, for a purpose hereinafter set forth, to be withdrawn without causing the end of the shaft supported therein to drop.

D is a circular saw, of common construction, secured upon the shaft C, to revolve with it, and moving within a slot, *t*, provided in the top portion of the frame A.

E is a sliding shoe, having the form of a T-rail, the vertical portion of which extends across the opening usually provided in the frame A, and of which the horizontal or top portion is supported at its opposite extremities to slide upon guides *s* in the frame. A slot, *t'*, corresponding with the slot *t*, through which the saw D projects, is provided in the top portion of the shoe E, at one side of the vertical portion thereof, to admit a circular saw, D', the central opening in which, recessed to engage with a feather upon the shaft, to permit its adjustment on the shaft C, and cause it to be revolved with the same, coincides with a similar opening formed transversely through the vertical portion of the shoe to admit the shaft through it. A bent lever of the first class, F, is linked centrally below the shaft C to the outer side of the vertical portion of the shoe E, and fulcrumed to a cross-bar, *r*, in the frame A. At its opposite extremity, *r'*, bent to a right angle, the lever F is linked to a lever of the second class, F', which is fulcrumed toward its lower extremity to the frame, as shown, extending upward beyond the same, where it is provided with a spring-pawl, q', of common construction, to engage with a segmental rack, q, spaced off and having the spaces numbered. By moving the lever F' forward or backward, the shoe E carrying the saw D' is moved upon the shaft through the medium of the lever F, toward or from the saw D a distance in inches indicated by numbers upon the rack q. Of course the greater the distance from the fulcrum of the linked extremity of the straight arm of the lever F, the shorter will be the spaces upon the rack q to indicate inches of movement of the shoe E.

The usual feed-rollers are provided for the ordinary purpose in the form of a longitudinally-fluted roller, G', resting in bearings in the frame A, on each side of the plane of movement of the revolving saws, and a smooth roller, G, above each roller, G', and adjustable in a vertical direction, my invention in this connection relating to the particular manner of adjustment of the rollers G. The rectangular frame p, Fig. 4, for each roller, G, in which the latter forms the upper cross-bar by being journaled at its opposite extremities in the vertical sides, which are slotted, as shown at x, to surround the journals of the rollers G' and permit them to be moved up and down without obstruction from such journals, is confined laterally in vertical grooves p', provided on the inner sides of the perpendicular standards of the frame A, and the lower cross-piece, o. of each frame p is provided with a central opening, o', above which, on one face of the cross-piece, a cylindrical pulley, $o^2$, is journaled.

H, H', and $H^2$ are shafts, supported, to permit them to be oscillated, in journal-bearings upon opposite sides of the horizontal lateral cross pieces of the frame A, the shafts H and H' serving to adjust the roller G behind the saws, and the shaft $H^2$ to adjust the roller G in front of the saws, all as hereinafter described. A tapering finger, n, Fig. 4, is secured at its broader end upon each shaft H, H', and $H^2$ to cause its tapered extremity to project through the opening o' in the cross-piece o, and be in contact with the pulley $o^2$; and each shaft is provided at one extremity, on the same side of the frame A, with a foot-lever, I. The foot-levers I on the shafts H and H' extend in opposite directions to permit adjustment of the same roller G, this contrivance simply affording a convenient mechanism to permit the operator also to raise the roller G if he should, at the time it requires raising, be stationed near the shaft H. The lever mechanism on the shaft $H^2$ for raising the roller G in vertical line with this shaft is not shown in detail in the drawings, as it corresponds exactly with that on the shaft H', (Shown in Fig. 4.)

To drive the shaft C, a pulley, m, Fig. 2, is provided, around which the drive-belt passes. As, however, the feed-rollers G G' should revolve slower than the shaft carrying the saws, cog-wheels and pulleys, geared as hereinafter described, are provided.

Upon the shaft C, adjacent to the pulley m, is a smaller pulley, m', (Shown in dotted lines in Fig. 3 of the drawings,) which is connected by a belt-connection, l, with a pulley, $m^2$, on a shaft, $m^3$, journaled in the frames A and A'. The pulley $m^2$ is geared by a belt, l', to a pulley, k, on a shaft, k', also journaled in the frames A and A', and which carries on its inner end a pulley, $k^2$. (Shown in dotted lines in Fig. 2.) This last-named pulley is geared by means of a belt, $l^2$, Fig. 3, to a pulley, k, (shown in Fig. 6,) on the inner end of a shaft, i, which projects through the frame A, and carries on its outer extremity a small cog-wheel, K. The wheel K meshes with larger cog-wheels K' on each side, journaled upon the frame A, and each of these meshes with a still larger cog-wheel, $K^2$, upon the end of the journal of each fluted roller G'. It will thus be seen that the rollers G' are revolved slower than the shaft C in proportion to the different diameters of the wheels K and $K^2$.

The table B, which is provided at one end with the usual rollers, L, to assist in lifting upon it the boards to be sawed, and allow ready sliding of them upon the table, is provided with a longitudinal slot, h, in line with the slot t, through which the saw D projects, to afford a sight for the proper linear adjustment of a board to be sawed, and a further slot, h', wider than the slot h, but parallel with it, affords a convenient and simple means of guiding a board straight to the saws, which the operator may accomplish, without keeping his eyes upon the work, by following the side of the slot with his hand against the end of the board. A board is passed over the first roller, G', under the adjacent roller G, which is raised for the purpose by pressing downward with one foot upon the adjacent lever I, and allowed thereafter to fall and rest upon the surface of the board, and thus fed to the saws, from which the sawed strips are carried by the rear roller, G', the adjacent roller G being, like the first already described, actuated to permit their entrance between the rollers from the machine.

More than one saw D' may be adjusted on the shaft C, in the manner represented in Fig. 6 of the drawings. To adjust them either all the same or at varying distances apart with relation to the stationary saw D, the lever F is entirely removed by unhooking it from its connections, and the shoe E, with its saw D', taken from the shaft C on removing the shoe M, Fig. 1, from the frame by withdrawing from the tongues g' the screws g, which secure it in position. My improvement, therefore, in connection with the movable saw D', does not prevent the adjustment at will of any number of saws within the linear capacity of the shaft C, since they may be slipped thereon with intervening washers, f, to maintain them apart a desired distance or desired distances, whereby several strips—such as laths—may be cut simultaneously from the same board. A nut, N, working upon a screw-thread, N', provided upon the shaft toward its extremity, will serve, through the medium of the washers f, to secure the saws, when once set, from lateral displacement, and when they are once adjusted the shoe M is replaced in its position.

What I claim as new, and desire to secure by Letters Patent, is—

1. In a sawing-machine, the combination, with the rotary shaft carrying to rotate with it a stationary circular saw, of a saw, D', in a sliding shoe, E, laterally movable on the shaft, a lever, F, connected toward one extremity to the shoe E, and passing backward and fulcrumed to the frame of the machine, and a lever, F', fulcrumed to the frame toward its lower end, and extending upward and connected between its handle and fulcrum with the bent end of the lever F, as and for purpose set forth.

2. In a sawing-machine, the combination, with the rotary shaft carrying to rotate with it a stationary circular saw, of a saw, D', in a sliding shoe, E, laterally movable on the shaft, a bent lever, F, connected toward one extremity to the shoe E, and passing backward and fulcrumed to the frame of the machine, a lever, F', fulcrumed to the frame toward its lower end and extending upward and connected between its handle and fulcrum with the bent end of the lever F, and provided with a spring-pawl, q', and a rack, q, for retaining the lever F' in locked position, the whole being constructed and arranged to operate substantially as described.

3. In a sawing-machine, the combination, with the frame A of the machine and the feed-roller G', of a roller, G, journaled in a frame, p, having a vertical movement within guides p', formed in the frame A, and foot-lever mechanism, substantially as described, connected with the frame p to actuate it, as and for the purpose set forth.

4. In a sawing-machine, the combination, with the frame A of the machine and the feed-roller G', of a roller, G, journaled in a frame, p, having a vertical movement within guides p', formed in the frame A, one or more rock-shafts, H H' H², carrying each a finger, n, which projects through the frame p, and a foot-lever, I, for each rock-shaft, the whole being constructed arranged and to operate as and for the purpose set forth.

5. In a sawing-machine, the combination, with the frame A and the feed-rollers G', of the rollers G, journaled in frames p, having vertical movement within guides p', formed in the frame A, rock-shafts H, H', and H², carrying each a finger, n, projecting through the lower cross-piece of each frame p, provided with a roller, o², a foot-lever, I, upon each rock-shaft, H' and H², extending in parallel directions, and a foot-lever, I, upon the rock-shaft H, extending in a direction contrary to the levers I on the rock-shafts H' and H², as and for the purpose set forth.

6. A sawing-machine having a frame, A, supporting a rotary shaft, C, carrying a stationary circular saw, D, and a movable circular saw, D', and a feed-table, B, supported by the frame A, and provided with a feed-roller, G', and a roller, G, and a guide-slot, h', parallel with the plane of motion of the saws, the whole being constructed and arranged to operate substantially as described.

7. A sawing-machine having a frame A, supporting a rotary shaft, C, carrying a stationary circular saw, D, and a movable circular saw, D', and a feed-table, B, supported by the frame A, and provided with a feed-roller, G', and roller G, and with a slot, h, in line with the saw D, and a guide-slot, h', parallel with the plane of motion of the saws, the whole being constructed and arranged to operate substantially as described.

CONRAD TRIER.

In presence of—
MASON BROSS,
EDWARD THORPE.